(12) United States Patent
Balistreri

(10) Patent No.: US 10,625,544 B2
(45) Date of Patent: Apr. 21, 2020

(54) VALVE ASSEMBLY FOR A TIRE PRESSURE MANAGEMENT SYSTEM

(71) Applicant: DANA HEAVY VEHICLE SYSTEMS GROUP, LLC, Maumee, OH (US)

(72) Inventor: Lucas A. Balistreri, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/092,852

(22) PCT Filed: Apr. 13, 2017

(86) PCT No.: PCT/US2017/027344
§ 371 (c)(1),
(2) Date: Oct. 11, 2018

(87) PCT Pub. No.: WO2017/180830
PCT Pub. Date: Oct. 19, 2017

(65) Prior Publication Data
US 2019/0126693 A1 May 2, 2019

Related U.S. Application Data

(60) Provisional application No. 62/322,025, filed on Apr. 13, 2016, provisional application No. 62/460,030, filed on Feb. 16, 2017.

(51) Int. Cl.
*F16K 15/20* (2006.01)
*B60C 23/00* (2006.01)
(Continued)

(52) U.S. Cl.
CPC ......... *B60C 23/003* (2013.01); *B60C 29/06* (2013.01); *F16K 15/207* (2013.01);
(Continued)

(58) Field of Classification Search
CPC ................. Y10T 137/36; Y10T 137/3646
(Continued)

(56) References Cited

U.S. PATENT DOCUMENTS 2,593,423 A * 4/1952 Eastman ............... F16K 17/168
137/226
2,690,757 A * 10/1954 Orchowski ............ F16K 15/20
137/226
(Continued)

FOREIGN PATENT DOCUMENTS

| DE | 102007001056 | 7/2008 |
|---|---|---|
| WO | 2014028142 | 2/2014 |
| WO | 2014124429 | 8/2014 |

OTHER PUBLICATIONS

European Patent Office, International Search Report with Written Opinion issued in PCT/US2017/027344, dated Jul. 3, 2017, 13 pages, European Patent Office, Rijswijk Netherlands.

*Primary Examiner* — Robert K Arundale
(74) *Attorney, Agent, or Firm* — McCoy Russell LLP

(57) ABSTRACT

A valve assembly for a tire pressure management system includes a housing having a first perforation and a second perforation. The first perforation is selectively in fluid communication with the second perforation. A shuttle assembly is provided in the housing. A failsafe piston is connected to the shuttle assembly. A first biasing member applies a bias to the failsafe piston. A second biasing member applies a bias to the shuttle assembly. When a pressure differential between a pressure in the second perforation and a pressure in the first perforation is at or below a predetermined value, the bias applied by the first biasing member urges the failsafe piston toward the shuttle assembly to prevent fluid communication between the first perforation and the second perforation.

19 Claims, 10 Drawing Sheets

(51) Int. Cl.
*F16K 17/04* (2006.01)
*B60C 29/06* (2006.01)
*B60S 5/04* (2006.01)

(52) U.S. Cl.
CPC ............ *F16K 17/044* (2013.01); *B60S 5/043* (2013.01); *Y10T 137/3646* (2015.04)

(58) Field of Classification Search
USPC .......................................................... 152/427
See application file for complete search history.

(56) References Cited

U.S. PATENT DOCUMENTS

| | | | |
|---|---|---|---|
| 3,450,147 A * | 6/1969 | Webb | B60C 29/06 137/226 |
| 3,454,033 A * | 7/1969 | Smith | B60C 23/0496 137/226 |
| 4,640,331 A | 2/1987 | Braun | |
| 4,678,017 A | 7/1987 | Schultz | |
| 4,724,879 A | 2/1988 | Schultz | |
| 4,744,399 A | 5/1988 | Magnuson | |
| 4,754,792 A | 7/1988 | Braun | |
| 4,877,048 A | 10/1989 | Oltean | |
| 4,883,105 A | 11/1989 | Schultz | |
| 4,893,664 A | 1/1990 | Oltean | |
| 4,895,199 A | 1/1990 | Magnuson | |
| 5,293,919 A | 3/1994 | Olney | |
| 5,413,159 A | 5/1995 | Olney | |
| 5,544,688 A * | 8/1996 | Freigang | B60C 23/003 152/415 |
| 5,553,647 A | 9/1996 | Jaksic | |
| 6,672,328 B2 | 1/2004 | Colussi | |
| 8,353,311 B2 * | 1/2013 | Rigamonti | F16K 17/30 137/498 |
| 8,356,620 B2 | 1/2013 | Colussi | |
| 8,844,596 B2 | 9/2014 | Medley | |
| 9,132,704 B2 | 9/2015 | Wilson | |
| 9,296,264 B2 | 3/2016 | Mozingo | |
| 9,308,788 B2 | 4/2016 | Fazekas | |
| 9,415,645 B2 | 8/2016 | Racine | |
| 2002/0170597 A1 | 11/2002 | Colussi | |
| 2007/0023083 A1* | 2/2007 | Huang | F16K 15/026 137/226 |
| 2008/0047613 A1* | 2/2008 | Huang | F16K 15/20 137/226 |
| 2008/0115838 A1 | 5/2008 | Huang | |
| 2010/0282333 A1* | 11/2010 | Newman | F16K 1/306 137/115.13 |

\* cited by examiner

VALVE ASSEMBLY FOR A TIRE PRESSURE MANAGEMENT SYSTEM

CROSS-REFERENCE TO RELATED APPLICATION

This application is claiming the benefit, under 35 U.S.C. 119(e), of the provisional U.S. patent application which was granted Ser. No. 62/322,025 and filed on Apr. 13, 2016 and the provisional U.S. patent application which was granted Ser. No. 62/460,030 and filed on Feb. 16, 2017, the entire disclosures of which are hereby incorporated by reference.

BACKGROUND OF THE INVENTION

The invention relates to a valve assembly for a tire pressure management system.

Tire pressure management systems such as, for example, central tire inflation systems can be utilized to manually and/or automatically increase or decrease tire pressure. Typically, a tire pressure management system utilizes a wheel valve affixed to each wheel for effecting tire pressure adjustments. However, the wheel valves known in the art are only effective over a narrow operating range of tire pressures.

As a non-limiting example, the operating range for a conventional wheel valve may be up to about a tire pressure of 100 pounds per square inch (psi). When exposed to tire pressures greater than the aforementioned pressure, said conventional wheel valves may leak or fail. Additionally, such wheel valves may not perform well at low tire pressures. As another non-limiting example, when the tire, pressure is below 5 psi, conventional wheel valves may fail to close. Such a failure may result in the tire pressure approaching 0 psi and the tire decoupling from the wheel rim.

Therefore, it would be desirable to provide a valve assembly which overcomes the disadvantages known in the prior art designs.

BRIEF SUMMARY OF THE INVENTION

Embodiments of a valve assembly for a tire pressure management system are provided.

In an embodiment, the valve assembly comprises a housing having a first perforation and a second perforation. The first perforation is selectively in fluid communication with the second perforation. A shuttle assembly is provided in the housing. A failsafe piston is connected to the shuttle assembly. A first biasing member applies a bias to the failsafe piston. A second biasing member applies a bias to the shuttle assembly. When a pressure differential to between a pressure in the second perforation and a pressure in the first perforation is at or below a predetermined value, the bias applied by the first biasing member urges the failsafe piston toward the shuffle assembly to prevent fluid communication between the first perforation and the second perforation.

In another embodiment, the valve assembly comprises a housing having a first perforation and a second perforation. The first perforation is selectively in fluid communication with the second perforation. A shuttle assembly is provided in the housing. A failsafe piston is connected to the shuttle assembly via a shaft. A first biasing member applies a bias to the failsafe piston. A second biasing member applies a bias to the shuttle assembly in a direction away from the first perforation. When a pressure differential between a pressure in the second perforation and a pressure in the first perforation is at or below a predetermined value, the bias applied by the first biasing member urges the failsafe piston toward the shuttle assembly to prevent fluid communication between the first perforation and the second perforation.

BRIEF DESCRIPTION OF THE SEVERAL VIEWS OF THE DRAWING

The above, as well as other advantages of the embodiments will become readily apparent to those skilled in the art from the following detailed description when considered in the light of the accompanying drawings in which.

DETAILED DESCRIPTION OF THE INVENTION

Figure 1:
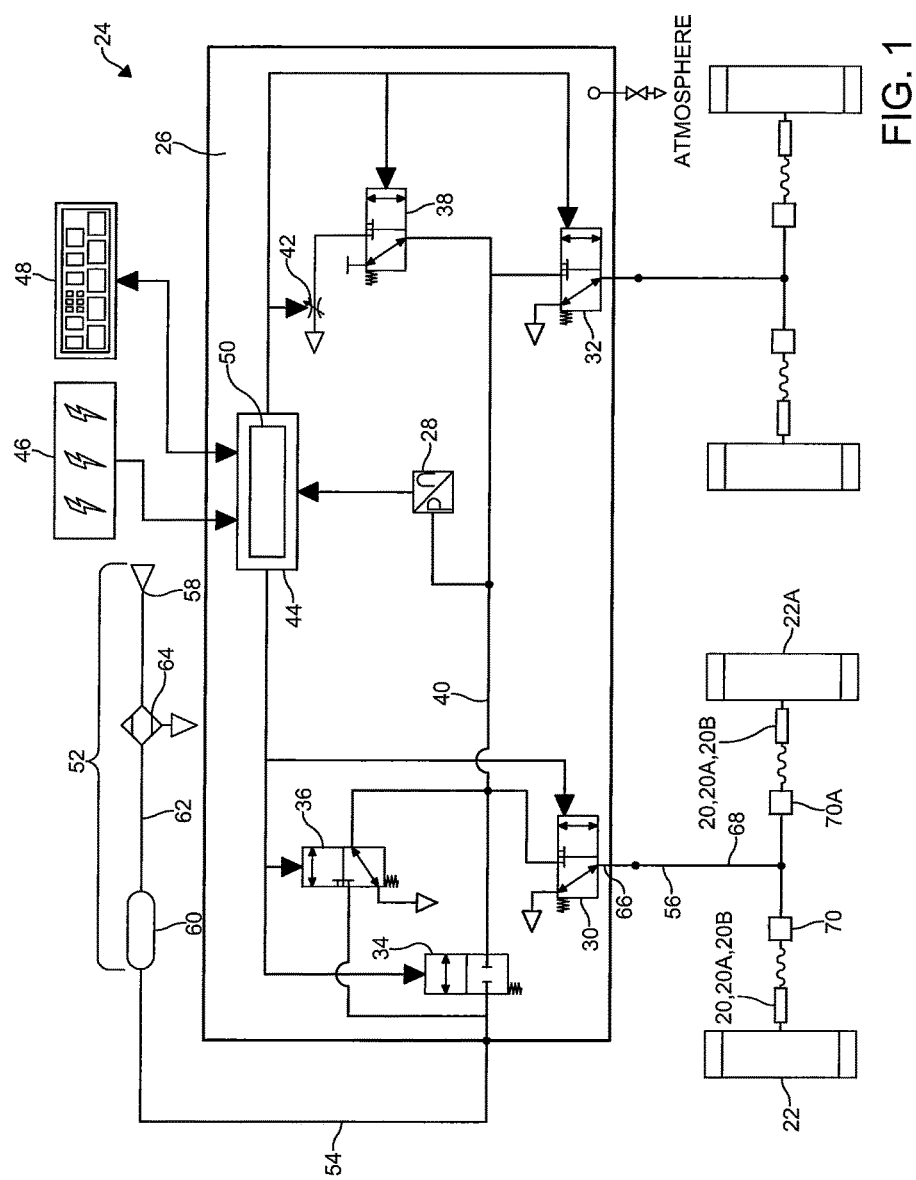
FIG. 1 depicts a schematic view of a tire pressure management system.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts. Hence, specific dimensions, directions or other physical characteristics relating to the embodiments disclosed are not to be considered as limiting, unless expressly state otherwise. Also, although they may not be, like elements in various embodiments may be commonly referred to with like reference numerals within this section of the application.

Various embodiments of a valve assembly 20, 20A, 20B are described herein. The embodiments of the valve assembly 20, 20A, 20B described herein may have applications to commercial and off-highway vehicles. Also, it would be understood by one of ordinary skill in the art that these embodiments could have industrial, passenger, locomotive, military, and aerospace applications.

Referring now to FIG. 1, the valve assembly 20, 20A, 20B is preferably utilized adjacent a wheel assembly 22. In certain embodiments, the valve assembly 20, 20A, 20B may be attached to the wheel assembly 22. However, it should be appreciated that the valve assembly may be used with other types of assemblies. For example, the valve assembly may be utilized in a pneumatic assembly.

Preferably, the wheel assembly 22 comprises a tire and a wheel rim. The tire and the wheel rim may be conventional in the art. The tire is attached to the wheel rim and the valve assembly 20, 20A, 20B may be attached to the wheel rim or another portion of the wheel assembly 10 such as, for example, a tire stem. Attaching the tire to the wheel rim forms the wheel. The wheel houses a pressurized fluid such as, for example, air. The pressurized air housed in the wheel will be referred to herein as tire pressure.

On an end, the valve assembly 20, 20A, 20B is in fluid communication with the wheel. On an opposite end, the valve assembly 20, 20A, 20B is also in fluid communication with one or more portions of a tire pressure management system 24. The tire pressure management system 24 may be of the central tire inflation system (CTIS) variety. The tire pressure management system may have inflate only capability to allow one or more tire pressures to be increased. However, it is preferred that the tire inflation system has inflate and deflate capability to allow one or more tire pressures to be increased and/or decreased.

With reference to FIG. 1, the tire pressure management system 24 may comprise a control unit 26. The control unit 26 may comprise a pressure sensor 28 for measuring the pressure of air. Preferably, the control unit 26 also comprises a plurality of valve assemblies 30, 32, 34, 36, 38 which are of the solenoid variety, and a first fluid conduit 40 for controlling the flow of and directing air through the control unit 26. The control unit 26 may also comprise a variable area valve assembly 42.

The control unit 26 also comprises an electronic control portion 44. The electronic control portion 44 may receive input signals from the pressure sensor 28, a power supply 46, and one or more additional sensors such as, for example, a load sensor and a speed sensor. Additionally, the electronic control portion 44 may receive input signals from an operator control device 48.

The electronic control portion 44 may include a microprocessor 50 operating under the control of a set of programming instructions, which may also be referred to as software. The electronic control portion 44 may include a memory in which programming instructions are stored. The memory can also store identification codes, tire pressure records and/or user inputs over a period of time.

The electronic control portion 44 outputs signals to the valve assemblies 30-38, 42 to open or close the valve assemblies 30-38, 42. The electronic control portion 44 may also output signals to a display device. The display device may be included as a part of the operator control device 48 or a freestanding device.

The control unit 26 selectively communicates with an air supply 52 via an air supply circuit 54. The pressure sensor 28 measures the pressure of the air supply 52 via the air supply circuit 54 and the first fluid conduit 40. The control unit 26 also preferably comprises a control valve assembly 36. The control valve assembly 36 may be provided with an orifice which is smaller than the orifice of the supply valve assembly 34 and is utilized to provide a bleed of air from the air supply 52 to a fluid control circuit 56. Preferably, the supply valve assembly 34 and control valve assembly 36 are of the solenoid variety as mentioned above.

When it is desired to decrease the tire pressure, the control unit 26 provides a signal to a deflate valve assembly 38 to open. In the embodiment illustrated in FIG. 1, the deflate valve assembly 38 separates a variable area valve assembly 42 from the first fluid conduit 40 until it is desired to decrease the tire pressure. The variable area valve assembly 42 acts as a throttle valve and controls the pressure in the fluid control circuit 56 to prevent the valve assembly 20, 20A, 20B from closing when the tire pressure is being decreased. Preferably, the deflate valve assembly 38 and the variable area valve assembly 42 are as described in WO 2014/124429, the entire disclosure of which is hereby incorporated by reference. In other embodiments (not depicted), a valve assembly having a fixed orifice may be utilized in place of the variable area valve assembly. In these embodiments, the fixed orifice valve assembly is utilized to control the pressure in the fluid control circuit, which prevents the valve assembly from closing when the tire pressure is being decreased.

The air supply 52 is utilized to check the tire pressure and, if needed, increase and/or decrease the tire pressure. The air supply 52 is preferably provided by an air compressor 58 attached to the vehicle. Preferably, the air supply 52 also comprises a reservoir 60 such as, for example, a wet tank. The compressor 58 is in fluid communication with the reservoir 60 via a supply conduit 62. The air compressor 58 supplies pressurized air to the reservoir 60 for storage therein. Pressurized air from the air supply 52 is provided to the air supply circuit 54 via the reservoir 60. In certain embodiments, a drier 64 is provided for removing water from the air supply 52. A filter (not depicted) may also be interposed in the air supply circuit 54 or the supply conduit 62.

The control unit 26 selectively provides or receives pressurized air from the fluid control circuit 56. The fluid control circuit 56 is utilized to provide fluid communication between the control unit 26 and one or more wheels 22, 22A. Preferably, fluid communication between the control unit 26 and the one or more wheels 22, 22A is permitted or prohibited by opening or closing a channel valve assembly 30.

The fluid control circuit 56 comprises the valve assembly 20, 20A, 20B. The fluid control circuit 56 will be described below with reference to one valve assembly 20, 20A, 20B. However, it should be appreciated that the fluid control circuit 56 may comprise a plurality of valve assemblies 20, 20A, 20B. For example, a first valve assembly 20, 20A, 20B associated with a wheel 22 on a drive axle of the vehicle could be provided and a second valve assembly 20, 20A, 20B associated with another wheel 22A on the drive axle could be provided. Preferably, the first valve assembly 20, 20A, 20B and the second valve assembly 20, 20A, 20B are similarly configured. The fluid control circuit 56 may also comprise one or more fluid conduits 54, 56 and one or more rotary assemblies 58, 58A.

Preferably, the tire pressure is equal to a target tire pressure. The target tire pressure can be selected to be a desired pressure. After the target tire pressure is selected, it is programmed into the control unit 26. If it is determined that the tire pressure is not equal to the target tire pressure, the tire pressure can be adjusted. For example, in certain embodiments, if it is determined that the tire pressure is less than the target tire pressure, the tire pressure can be increased. In other embodiments, if it is determined that the tire pressure is greater than the target tire pressure, the tire pressure can be decreased.

Figure 4:
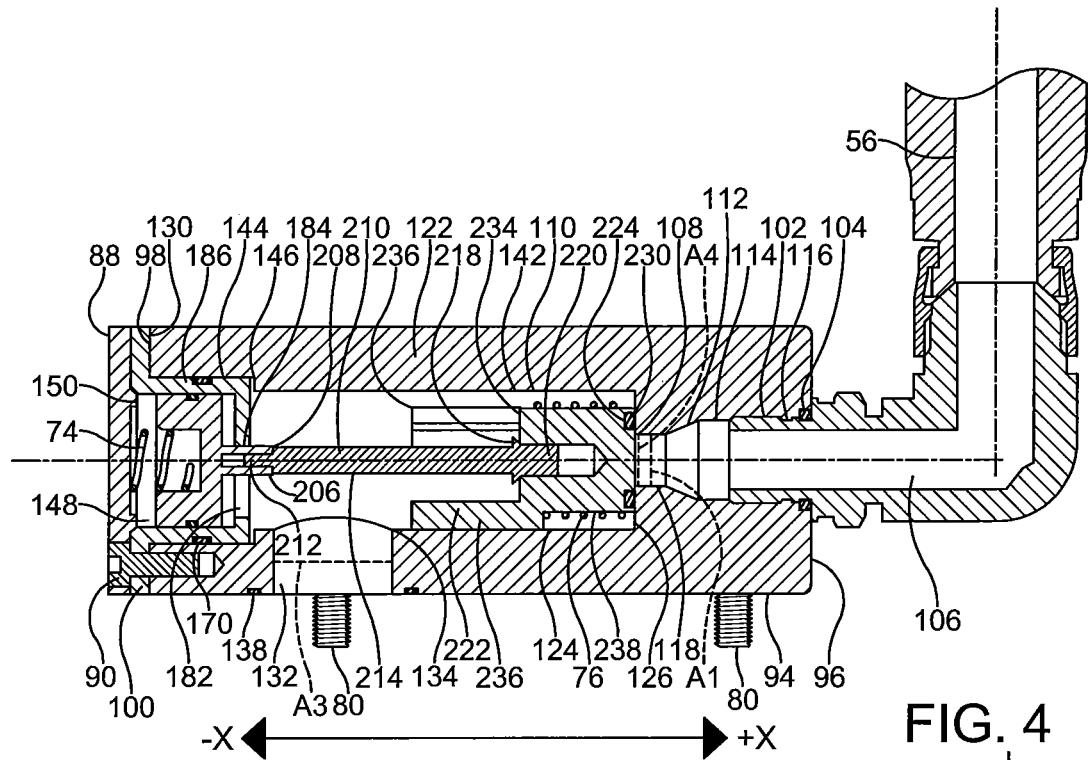
FIG. 4 depicts a sectional view illustrating the valve assembly of FIG. 2, in a rest state.
Figure 5:
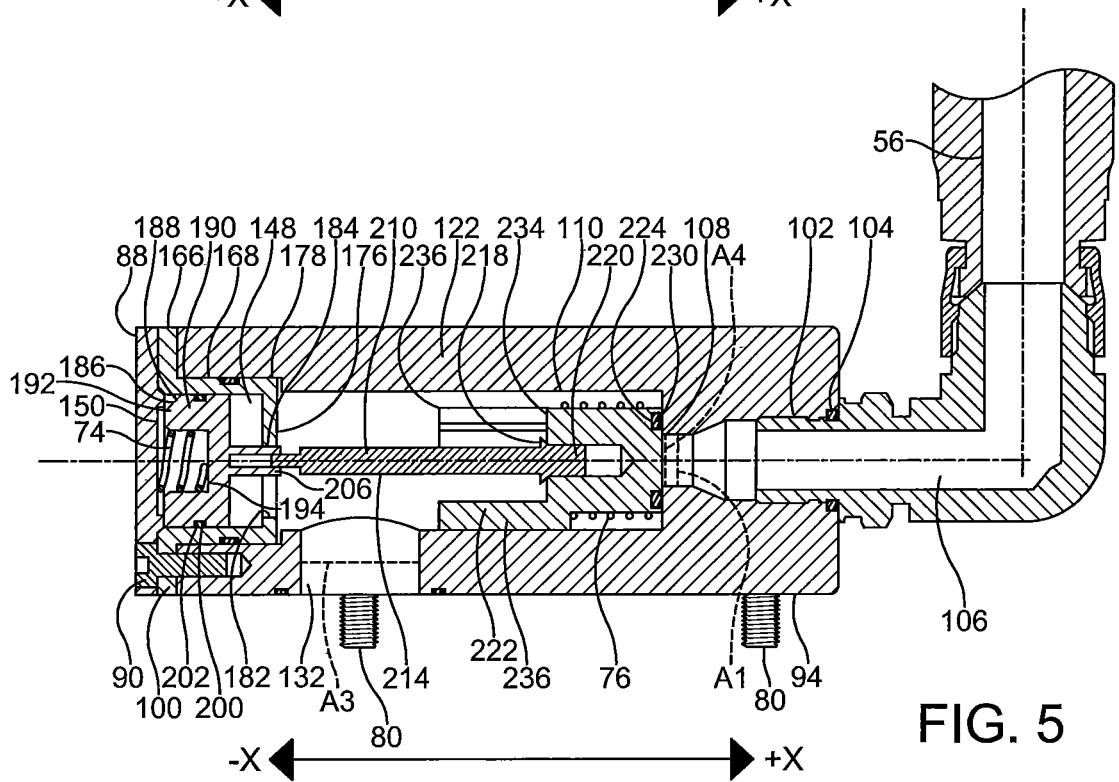
FIG. 5 is a perspective view illustrating the valve assembly of FIG. 2, in another rest state.
Figure 6:
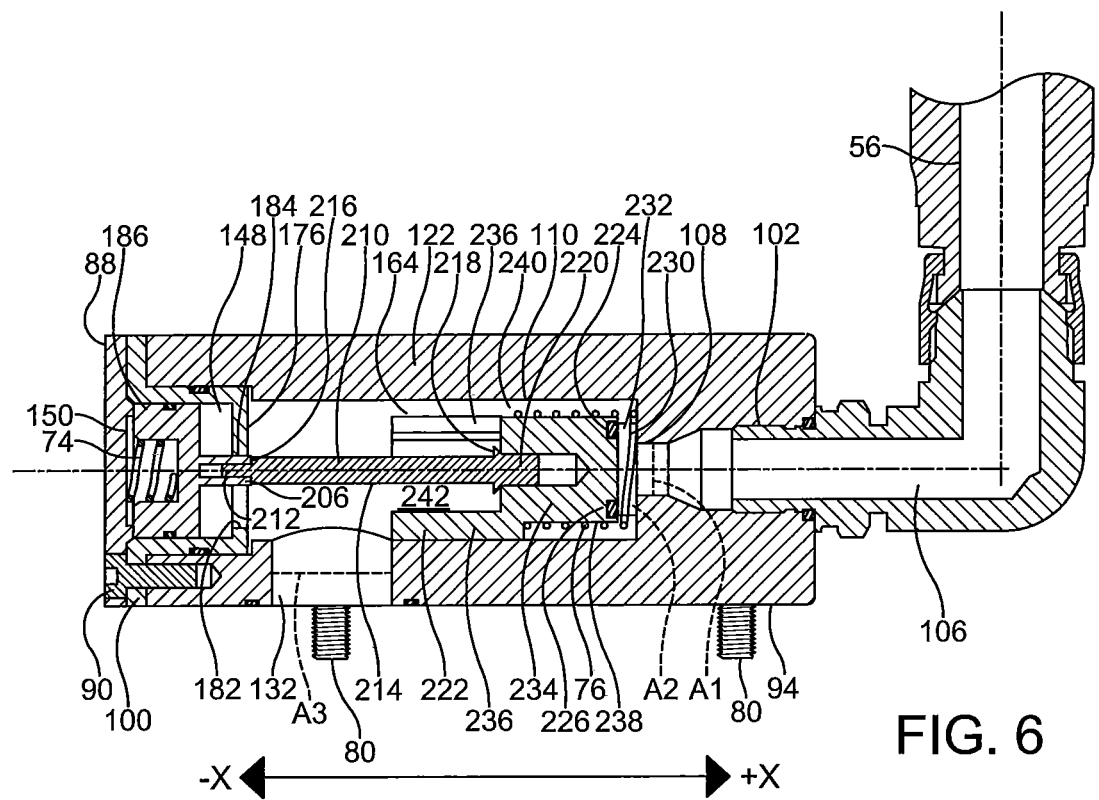
FIG. 6 is a perspective view illustrating the valve assembly of FIG. 2, in the measurement state, inflate state, or deflate state.
Figure 7:
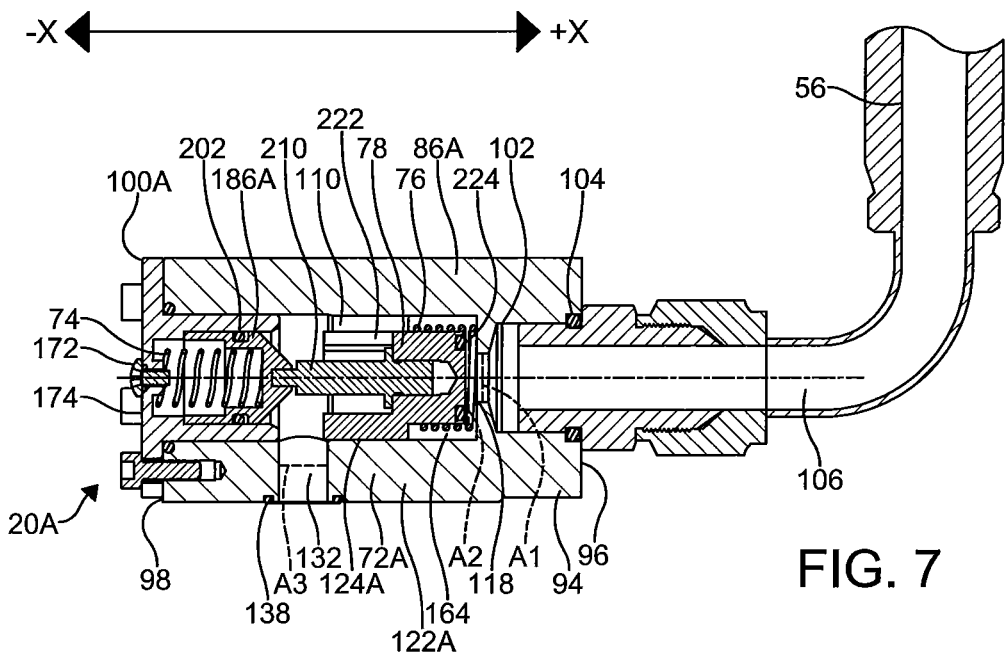
FIG. 7 depicts a sectional view illustrating another embodiment of a valve assembly for use in the tire pressure management system of FIG. 1, in the measurement state, inflate state, or deflate state.
Figure 11:
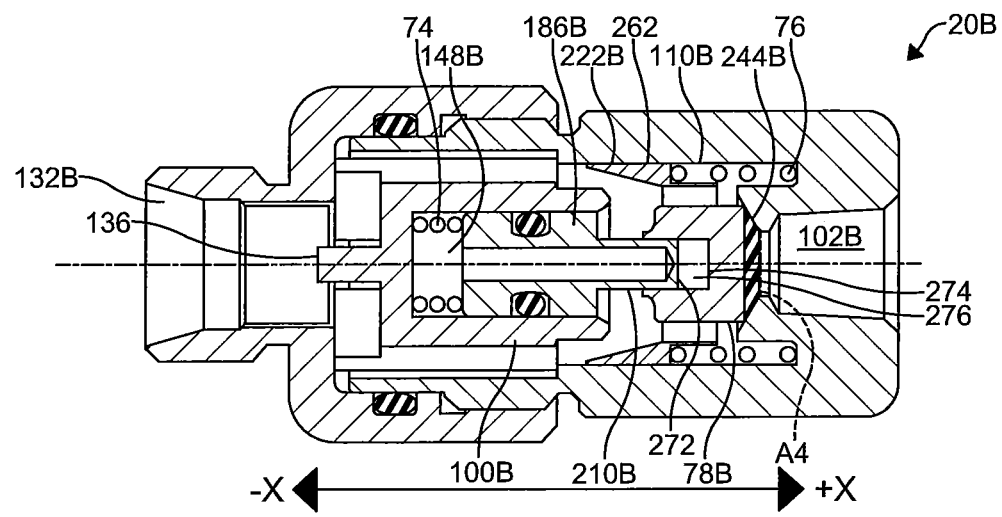
FIG. 11 depicts a sectional view illustrating the valve assembly of FIG. 9, in a rest state.
Figure 12:
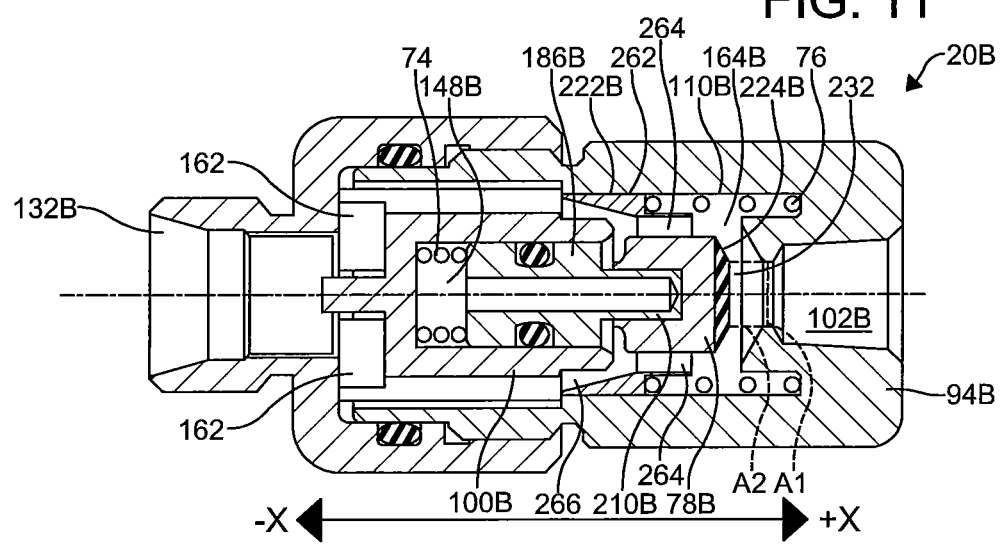
FIG. 12 depicts a sectional view illustrating the valve assembly of FIG. 9, in the measurement state, inflate state, or deflate state.

The valve assembly 20, 20A, 20B is utilized when measuring and/or adjusting the tire pressure. The valve assembly 20, 20A, 20B is also utilized to retain the pressurized air housed in the wheel. When the tire pressure is being measured or adjusted, the valve assembly 20, 20A, 20B allows pressurized air to be directed from the wheel 22 to certain portions of the tire pressure management system 24 and vice versa. During a tire pressure measurement or adjustment, the valve assembly 20, 20A, 20B is in an open position or placed in the open position. In FIGS. 6, 7 and 12, the valve assembly 20, 20A, 20B is shown in an open position. When the tire pressure is not being measured or adjusted, the valve assembly 20, 20A, 20B is in a rest state or placed in a rest state. In FIGS. 4 and 5, an embodiment of the valve assembly 20 is shown in separate rest states. It should also be noted that the embodiments of the valve assembly 20A, 20B shown in FIGS. 7-8, 11, and 13 are shown in separate rest states.

Referring now to FIGS. 2-6, 7-8, and 9-14, the valve assembly 20, 20A, 20B comprises a housing 72, 72A, 72B. The housing 72, 72A, 72B is preferably metallic. However, it should be understood that the housing may be formed utilizing other materials. Preferably, the housing is formed by joining a plurality of components. Alternatively, the housing may be a single member that is formed in a unitary manner. The valve assembly 20, 20A, 20B also comprises one or more biasing members 74, 76 and a shuttle assembly 78, 78B.

Figure 10:
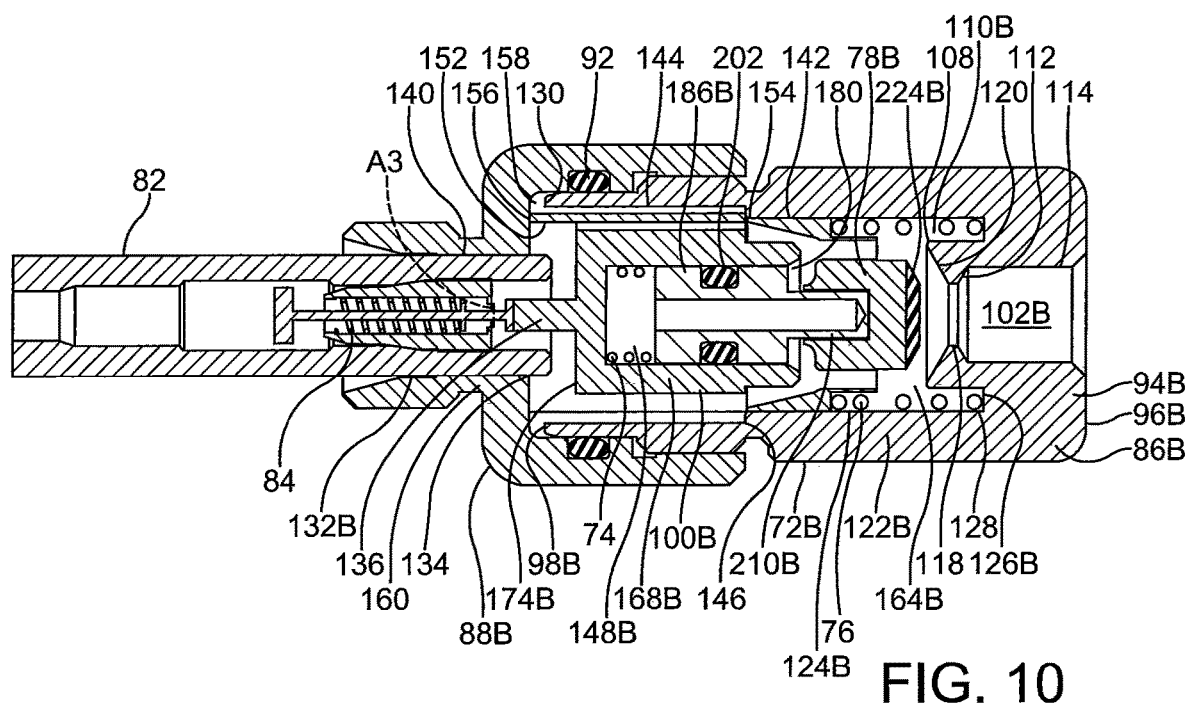
FIG. 10 depicts a sectional view illustrating the valve assembly of FIG. 9 and a portion of a tire stem, the valve assembly is illustrated in the measurement state, inflate state, or deflate state.

In certain embodiments, the housing 72, 72A is attached to the wheel 22 via one or more fasteners 80. In this embodiment, it is preferred that the housing 72, 72A is attached to the wheel rim portion of the wheel 22. In other embodiments, the housing 72, 72A may be attached to the wheel 22 via a threaded connection. In this embodiment, it is preferred that the housing 72B is attached to the tire stem 82 of the wheel 22. As illustrated in FIG. 10, the tire stem 82 may house a tire valve 84. In this embodiment, the tire valve 84 may be of the Schrader variety.

Figure 3:
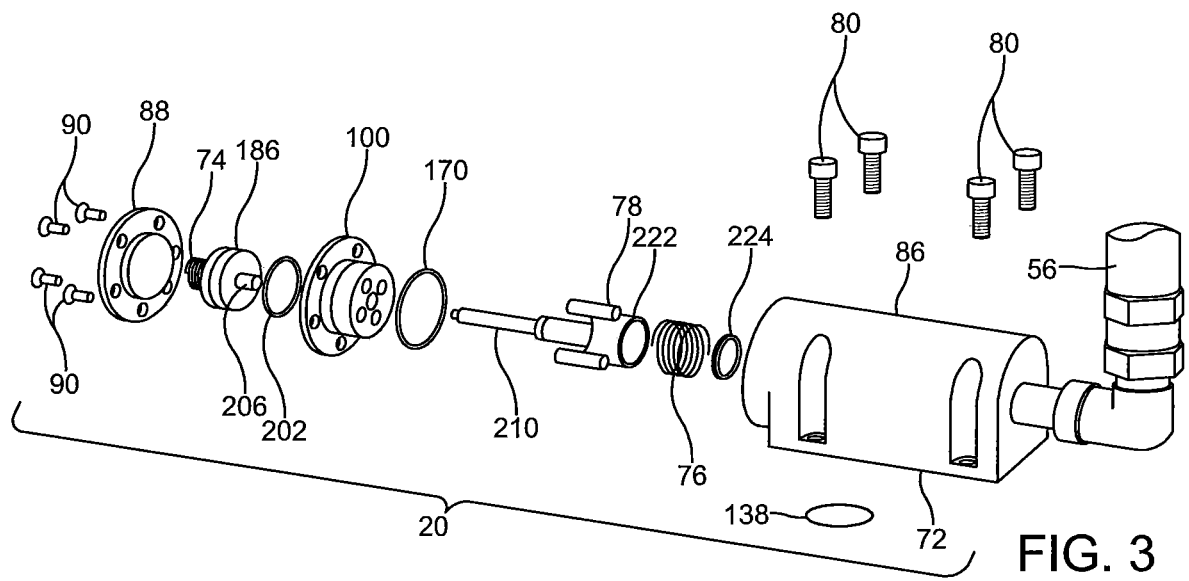
FIG. 3 depicts an exploded view of the valve assembly of FIG. 2.

In certain embodiments, like the ones illustrated in FIGS. 3 and 7, the housing 72, 72A may be generally of a cylindrical shape. In other embodiments, like the one illustrated best in FIGS. 9-10, the housing 72B may comprises two or more portions 86B, 88B, with each being of a generally cylindrical shape. In an embodiment, the housing 72 comprises a first portion 86, 86B and a second portion 88, 88B. In other embodiments, the housing 72A comprises only a first portion 86A. Preferably, the first portion 86, 86A, 86B is unitarily formed by casting a metal. However, it should be understood that the first portion 86, 86A, 86B may be formed using other materials and processes. When provided, the second portion 88, 88B may also be unitarily formed by casting a metal. However, it should be understood that the second portion 88, 88B may be formed using other materials and processes.

In the embodiments illustrated in FIGS. 2-6, the first portion 86 and the second portion 88 are attached to each other via one or more fasteners 90. In other embodiments, like those illustrated in FIGS. 9-13, the first portion 86B and the second portion 88B may be attached to each other via a threaded connection. In still other embodiments, the first portion and the second portion may be pressed together. In an embodiment, a sealing member 92 is provided between the first portion 86B and the second portion 88B. In this embodiment, the sealing member 92 may be an O-ring.

The first portion 86, 86A, 86B comprises a wall portion 94, 94B which defines a first end 96, 96B of the first portion. A second end 98, 98B of the first portion 86, 86A, 86B is open and is disposed opposite the first end 96, 96B. In an embodiment, the second portion 88, 88B is provided to close the second end 98, 98B. In another embodiment, like the one illustrated in FIGS. 7-8, a retaining member 100A closes the second end 98.

Figure 2:
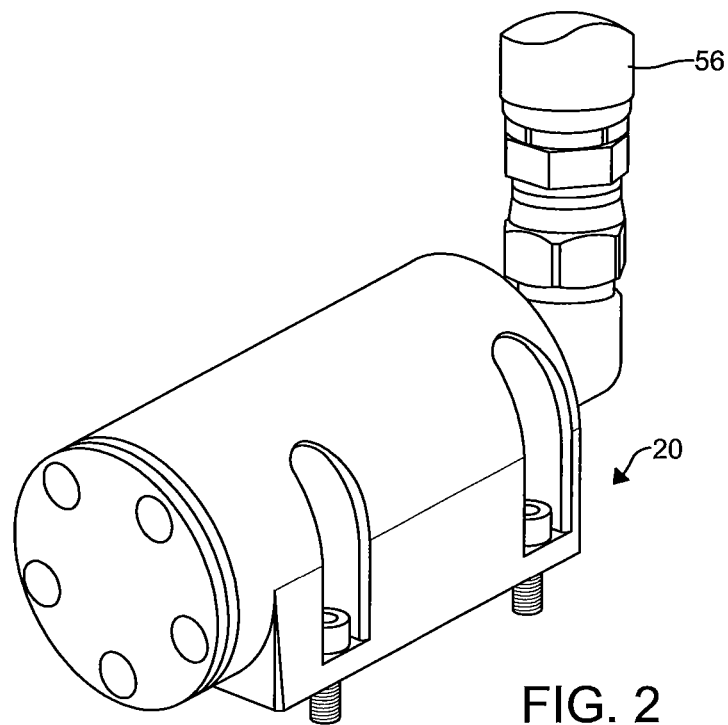
FIG. 2 depicts a perspective view of an embodiment of a valve assembly for use in the tire pressure management system of FIG. 1.

A first perforation 102, 102B may be formed through the wall portion 94, 94B. As illustrated in FIG. 2, on an end, the first perforation 102 is in fluid communication with the fluid control circuit 56. Referring now to FIG. 4, a seal member 104 may be provided between the wall portion 94 and a portion 106 of the fluid control circuit 56. In an embodiment, the seal member 104 is an O-ring. As shown in FIGS. 4 and 10, on an opposite end 86, the first perforation 102, 102B may be in fluid communication with a first cavity 110, 110B.

Figure 13:
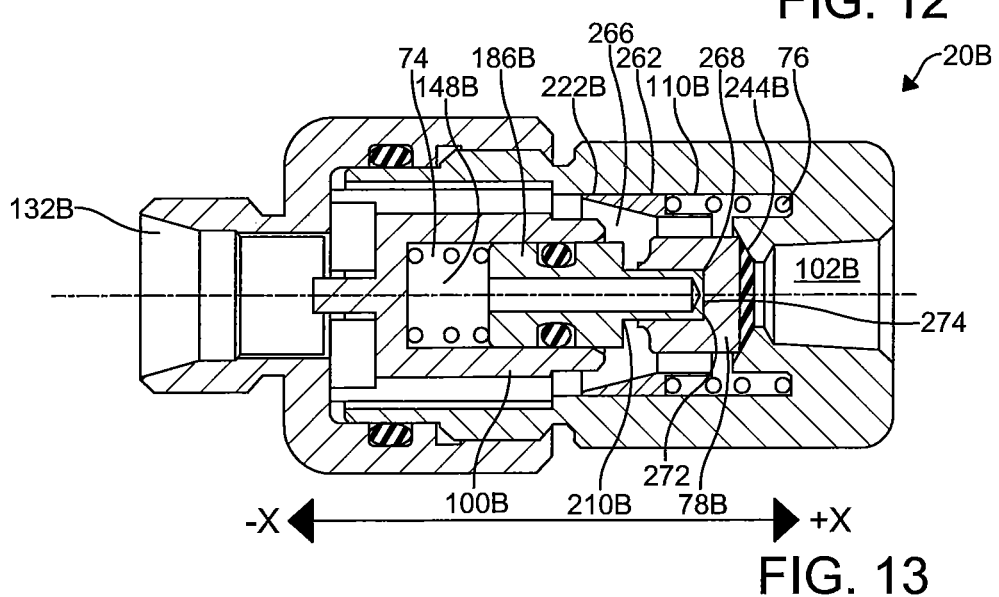
FIG. 13 depicts a sectional view illustrating the valve assembly of FIG. 9, in another rest state.
Figure 14:
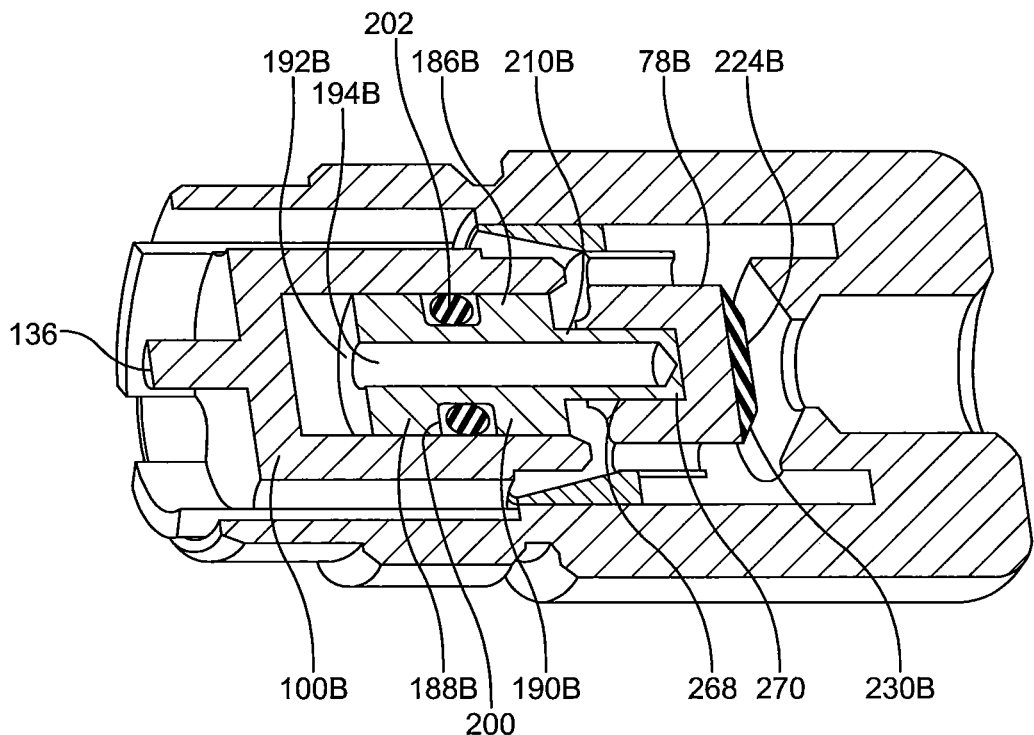
FIG. 14 depicts a perspective sectional view of a portion of FIG. 10.

The first perforation 102, 102B and the first cavity 110, 110B are aligned. In an embodiment, the first perforation 102 is of a generally cylindrical shape. In another embodiment, a first portion 112 of the first perforation 102 reduces in diameter toward the first cavity 110. In an embodiment, the first perforation 102 comprises a second portion 114. The second portion 114 may be of a generally cylindrical shape and is attached to a portion of the fluid control circuit 56 via a threaded connection 116 or in another manner. Adjacent the first cavity 110, 110B, the first perforation 102, 102B comprises a third portion 118. On an end, the third portion 118 is attached to and in fluid communication with the first portion 112. The third portion 118 may be of a generally cylindrical shape and, on an opposite end, in direct fluid communication with the first cavity 110 as illustrated in FIGS. 4 and 7. In other embodiments, the third portion 118 may be attached to and in fluid communication with a fourth portion 120 of the first perforation 102B as is illustrated in FIG. 10. Preferably, when provided, the fourth portion 120 gradually increases in diameter toward the first cavity 110B and is in direct fluid communication with the first cavity 110B. Providing the fourth portion 120 with a gradually increasing diameter allows the first perforation 102B to receive a portion of the shuttle assembly 78B when the valve assembly 20B is in a rest state, which is illustrated in FIGS. 11 and 13.

The wall portion 94, 94B is in a perpendicular relationship with an outer wall portion 122, 122A, 122B of the housing 72, 72A, 72B. The outer wall portion 122, 122A, 122B is of a generally cylindrical shape. The outer wall portion 122, 122A, 122B is attached to the wall portion 94, 94B and extends away therefrom. An inner surface 124, 124A, 124B of the outer wall portion 122, 122A, 122B and an inner surface 126, 126B of wall portion 94, 94B at least partially define the first cavity 110, 110B. In an embodiment, like the one illustrated in FIG. 10, the inner surface 124B of the outer wall portion 122B and the inner surface 126B of wall portion 94, 94B define a groove 128 that receives a portion of the second biasing member 76. An end surface 130 of the outer wall portion 122, 122A, 122B defines the second end 98, 98B of the first portion 86, 86B.

In certain embodiments, a second perforation 132, 132B is formed through the outer wall portion 122, 122A. In other embodiments, like the ones illustrated in FIGS. 10-13, the second perforation 132B is formed through the second portion 88B. On an end 134, the second perforation 132 is in fluid communication with the first cavity 110. Another end of the second perforation 132 is in fluid communication with the wheel 22. In certain embodiments, like the ones illustrated in FIGS. 2-6 and 7-8, the second perforation 132 is provided in a perpendicular relationship with the first perforation 102. In other embodiments, like the ones illustrated in FIGS. 10-13, the second perforation 132B is aligned with the first perforation 102B. In these embodiments, the second perforation 132B receives a portion of the tire stem 82.

The second perforation 132 may be in fluid communication with the wheel 22 via a passage (not depicted) formed in the wheel rim, tire stem, or another fluid conduit. In the embodiment illustrated in FIG. 10, the second so perforation 132B is in fluid communication with the wheel 22 via the tire stem 82. In these embodiments, the tire valve 84 may be continuously provided in an open position via contact by a depressor member 136 or via another member in order to ensure continuous fluid communication between the valve assembly 20B and the wheel 22. The depressor member 136 may be provided as a portion of the retaining member 100B. In an embodiment, the depressor member 136 extends from the first cavity 110B. The depressor member 136 extends into the second perforation 132B. Referring to FIG. 4, in certain embodiments, a sealing member 138 is provided between the outer wall portion 122, 122A and the wheel rim or the fluid conduit. In other embodiments like the one shown in FIG. 10, a fluid tight connection may be provided between the valve assembly 20B and the tire stem 82, which may be attached together by a threaded connection 140.

Also, the second perforation 132, 132B may be in fluid communication with the first perforation 102, 102B. The second perforation 132, 132B may be in fluid communication with the first perforation 102, 102B via the first cavity 110, 110B and one or more additional portions of the valve assembly 20, 20A, 20B. For example, when the valve assembly 20, 20A, 20B is in an open position, the first perforation 102, 102B and the second perforation 132, 132B are in fluid communication. However, when the valve assembly 20, 20A, 20B is in a rest state, the first perforation 102, 102B and the second perforation 132, 132B are not in fluid communication. Thus, the first perforation 102, 102B and the second perforation 132, 132B are selectively in fluid communication.

In certain embodiments, the inner surface 124, 124A, 124B of the outer wall portion 122, 122B has a first diameter portion 142 and a second diameter portion 144. The first diameter portion 142 partially defines the first cavity 110. The second diameter portion 144 has a diameter which is greater than a diameter of the first diameter portion 142. An interface 146 between the first diameter portion 142 and the second diameter portion 144 may be sharply defined. In other embodiments (not depicted), the inner surface may be of a substantially constant diameter.

In certain embodiments, the retaining member 100, 100B is at least partially disposed in the second diameter portion 144 of the outer wall portion 122, 122B. The retaining member 100, 100A, 100B is secured in the valve assembly 20, 20A, 20B so that its position is fixed. In the embodiments illustrated in FIGS. 2-6, the retaining member 100 may be attached to the outer wall portion 122 and the second portion 88 via the one or more fasteners 90. The retaining member 100, 100A, 100B at least partially defines a second cavity 148, 148A, 148B within the valve assembly 20, 20A, 20B. The second cavity 148 may also be defined by a portion 150 of the second portion 88 of the housing 72. In other embodiments, like the ones illustrated in FIGS. 7-8, the retaining member 100A is attached to the outer wall portion 122A via the one or more fasteners 90.

Figure 15:
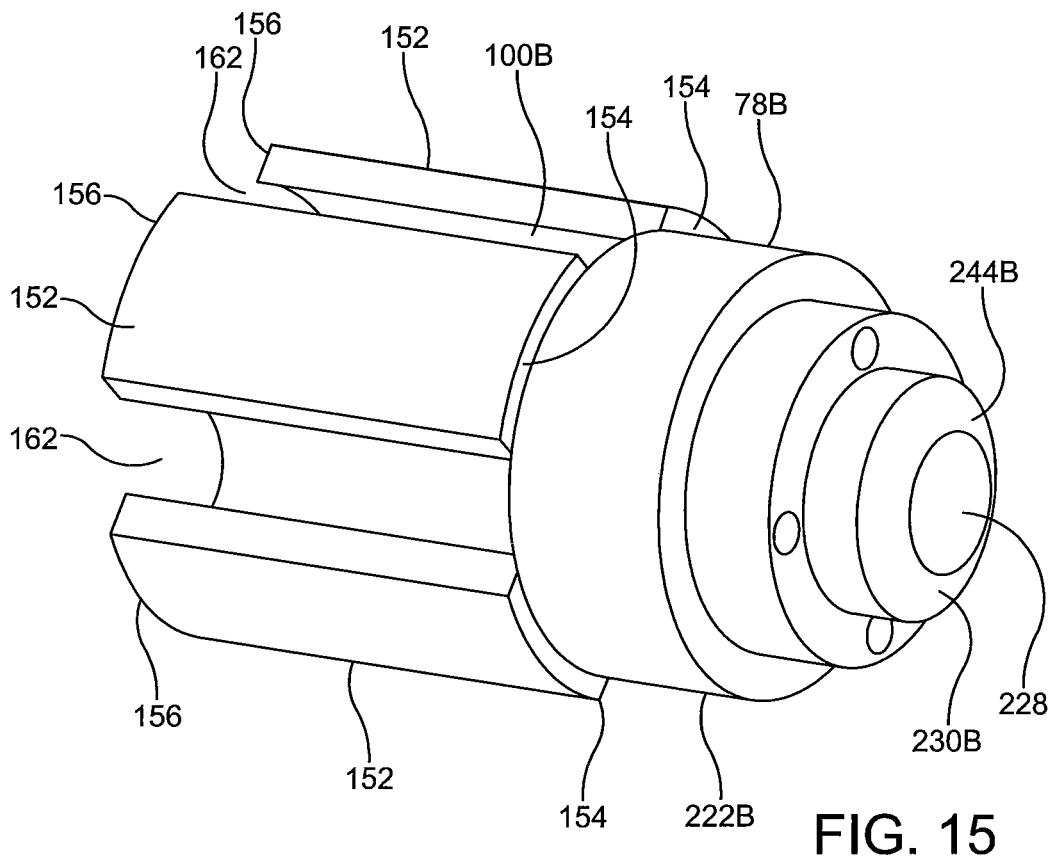
FIG. 15 depicts a perspective view of an embodiment of a shuttle assembly and a retaining member for use in the valve assembly of FIG. 9.

In certain embodiments, like the one illustrated in FIG. 10, the retaining member 100B comprises a plurality of legs 152. In an embodiment, four legs 152 are provided. As illustrated best in FIG. 15, the legs 152 are equally and circumferentially spaced apart. Each leg 152 comprises an upper edge 154 that is sharply defined. Referring back to FIG. 10, the upper edges 154 abut the interface 146 between the first diameter portion 142 and the second diameter portion 144. Referring back to FIG. 15, each leg 152 also has an end surface 156. Referring back to FIG. 10, each end surface 156 abuts an inner surface 158 of an end wall 160 of the second portion 88B. The abutting relationship between the legs 152 and the interface 1146 and the end wall 160 fixes the position of the retaining member 100B. The legs 152 define an outer diameter of the retaining member 100B. The outer diameter of the retaining member 100B is smaller than a diameter of the second diameter portion 144. In this embodiment, spaces 162 between successive legs 152 allow the second perforation 132B to communicate with the first cavity 110, 110B. The spaces 162 between successive legs 152 also form a portion of a fluid passage 164B through the valve assembly 20B when the valve assembly 20B is in the measurement state, inflate state, or deflate state.

In other embodiments, the retaining member 100, 100A may comprise a flange portion 166, 166A. In an embodiment, the flange portion 166 separates a portion of the second portion 88 from the end surface 130. When provided, the flange portion 166, 166A is attached to and in a perpendicular relationship with an outer wall portion 168, 168A on an end of the outer wall portion. In the embodiment illustrated in FIG. 5, the outer wall portion 168 of the retaining member 100 is disposed in and surrounded by the second diameter portion 144 of the outer wall portion 122. In this embodiment, a sealing member 170 is provided in a groove formed in the retaining member 100. In other embodiments, like the one shown in FIG. 8, the sealing member 170 is provided in a groove formed in the outer wall portion 122A of the first portion 86A. The sealing member 170 provides a seal between the outer wall portions 122, 122A, 168, 168A. In an embodiment, the sealing member 170 is an O-ring or a tube fitting seal.

Figure 8:
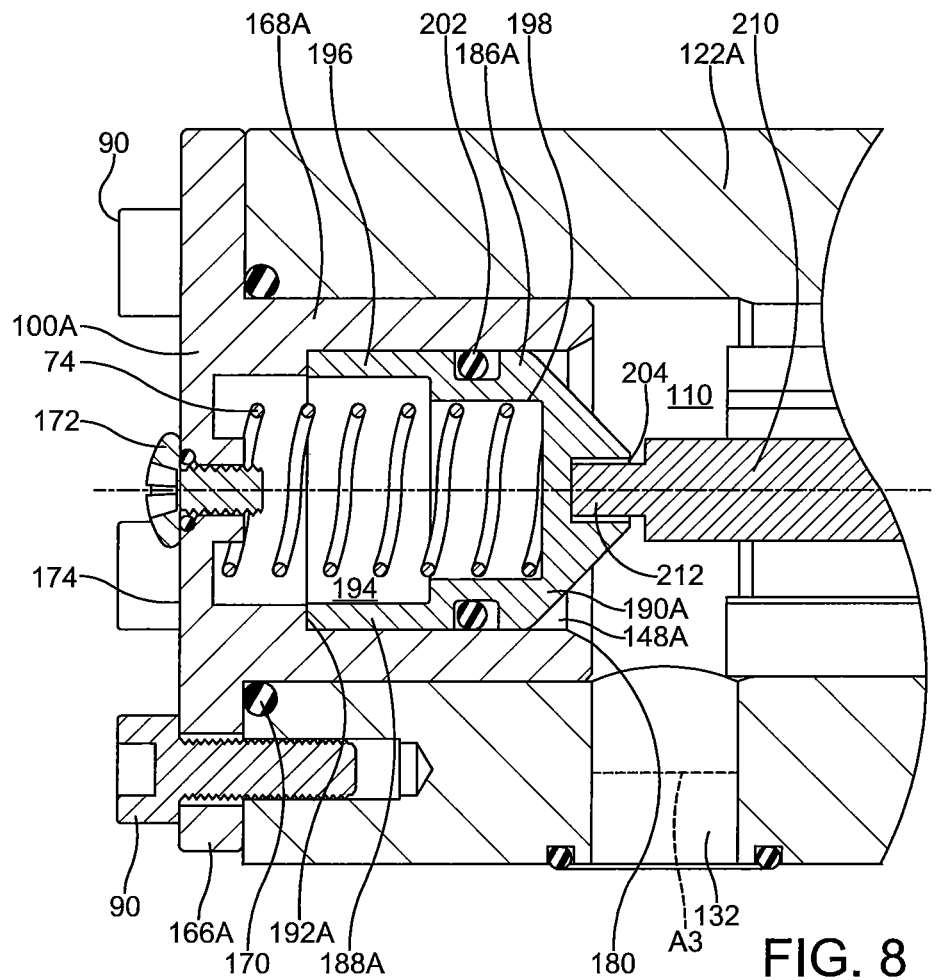
FIG. 8 depicts an enlarged view of a portion of the valve assembly of FIG. 7.
Figure 9:
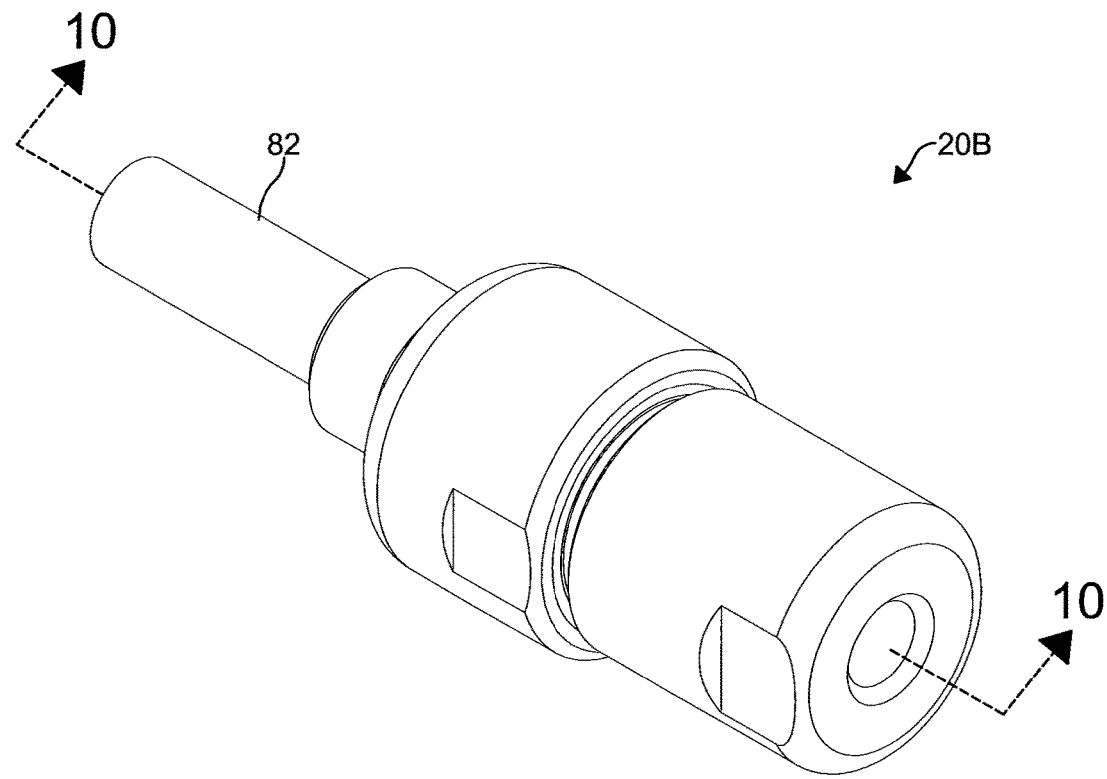
FIG. 9 depicts a perspective view of an embodiment of a valve assembly for use in the tire pressure management system of FIG. 1.

Referring now to the embodiments illustrated in FIGS. 7-8, a vent screw 172 may be attached to the retaining member 100A. In other embodiments (not depicted), a snap-in breathable vent membrane may be utilized instead of the vent screw. When provided, the vent screw 172 is disposed through an opening provided in an end portion 174 of the retaining member 100A. In the embodiments illustrated in FIG. 10, a vent screw is not provided. In these embodiments, the depressor member 136 is attached to a side of the end portion 174B. The depressor member 136 may be formed in a unitary manner with end portion 174B. Also, the first biasing member 74 is in contact with an opposite side of the end portion 174B. In these embodiments, on a side, the end portion 174, 174B defines a portion of the second cavity 148A, 148B. When provided, it is preferred that the vent screw 172 is removable from the valve assembly 20A so that when it is desired to vent the second cavity 148A the vent screw 172 can be removed from the outer end portion 174.

Referring back to the embodiments illustrated in FIGS. 2-6, on an opposite end, the outer wall portion 168 is attached to an end wall 176. An interface 178 of the outer wall portion 168 and the end wall 176 abuts the interface 146 of the first diameter portion 142 and the second diameter portion 144. The outer wall portion 168 and the end wall 176 are in a perpendicular relationship with each other. The end wall 176 is in a parallel relationship with the flange portion 166. In these embodiments, the end wall 176 divides the first cavity 110 from the second cavity 148. In other embodiments, like the ones shown in FIGS. 7-8 and 9-13, the outer wall portion 168A, 168B defines an open end 180 of the second cavity 148A, 148B.

The first cavity 110, 110B and the second cavity 148, 148A, 148B are in fluid communication with each other. In certain embodiments, the first cavity 110 and the second cavity 148 are in fluid communication with each other via one or more perforations 182. In these embodiments, the one or more perforations 182 are formed through the end wall 176. Preferably, the one or more perforations 182 are spaced apart from each other and positioned radially out from an end wall aperture 184. The end wall aperture 184 is formed through the end wall 176. The end wall aperture 184 is aligned with the first cavity 110 and the second cavity 148. The end wall aperture 184 is also aligned with the first perforation 102.

As best illustrated in FIG. 3, in an embodiment, the one or more perforations 182 comprise four perforations. The one or more perforations 182 allow pressurized air in the first cavity 110 to be communicated to the second cavity 148. In other embodiments, the first cavity 110, 110B and the second cavity 148, 148B are in fluid communication with each other via the open end 180 of the second cavity 148A, 148B.

A first biasing member 74 is disposed in the second cavity 148, 148A, 148B and may be housed within the retaining member 100. The first biasing member 74 may be disposed between the second portion 88 and the retaining member 100 or between the retaining member 100A, 100B and a failsafe piston 186A, 186B. In an embodiment, the first biasing member 74 is a compression spring. Preferably, in this embodiment, the first biasing member 74 is a coil spring. The biasing member 74 may be formed from a spring steel. However, it should be appreciated that the first biasing member 74 may be of another kind, type, make and/or formed from another material.

The first biasing member 74 is pretensioned. In the embodiments shown in FIGS. 2-6, on a first end, the first biasing member 74 contacts the second portion 88. In other embodiments, like the ones shown in FIGS. 7-13, the first end of the first biasing member 74 contacts the end portion 174, 174B of the retaining member 100A, 100B. On a second end, the first biasing member 74 contacts the failsafe piston 186, 186A, 186B. Contact by the first biasing member 74 applies a bias to the failsafe piston 186, 186A, 186B in a direction toward the first cavity 110, 110B, shuttle assembly 78, 78B, and/or the first peroration 102, 102B.

The failsafe piston 186, 186A, 186B is at least partially disposed within the retaining member 100, 100A, 100B. The failsafe piston 186, 186A, 186B is moveable within the second cavity 148, 148A, 148B. In certain embodiments and under certain conditions, which will be discussed below, the failsafe piston 186 may be urged toward the end wall 176 by pressurized air in the second cavity 148. Under other conditions, which will be discussed below, the failsafe piston 186, 186A, 186B is urged toward the first cavity 110, 110B, shuttle assembly 78, 78B, and/or the first peroration 102, 102B by the bias applied by the first biasing member 74.

The failsafe piston 186, 186A comprises a base portion 188, 188A, 188B and a cap portion 190, 190A, 190B. The base portion 188, 188A and the cap portion 190, 190A may be oriented in a perpendicular relationship with each other. Preferably, the base portion 188, 188A, 188B and the cap portion 190, 190A, 190B are formed in a unitary manner. In this embodiment, on a first end, the base portion 188, 188A, 188B is attached to the cap portion 190, 190A, 190B. In an embodiment like the one illustrated in FIG. 6, the cap portion 190 is of a generally circular shape. In an embodiment like the one illustrated in FIG. 8, the cap portion 190A is of a generally conical shape. Providing a generally conical-shaped cap portion 190A reduces the force provided by pressurized air on the failsafe piston 186A which improves the function of the valve assembly 20A. In another embodiment, like the one illustrated in FIG. 14, the cap portion 190B is annular.

In the embodiment illustrated in FIGS. 2-6, a second end 192 of the base portion 188 faces a portion of the second portion 88. In other embodiments, like the ones shown in FIGS. 7-13, the second end 192A, 192B of the base portion 188A, 188B faces a portion of the retaining member 100A, 100B. Under certain conditions, like those illustrated in FIGS. 5-6, the second end 192 of the base portion 188 abuts the second portion 88. In other embodiments and under those conditions, like those illustrated in FIGS. 7-8, the second end 192A of the base portion 188A faces and abuts a portion of the retaining member 100A. The base portion 188, 188A, 188B and the cap portion 190, 190A, 190B define a piston cavity 194, 194A, 194B. In an embodiment, like the one shown in FIGS. 7-8, the piston cavity 194A has a first diameter portion 196 and a second diameter portion 198. In this embodiment, the diameter of the first diameter portion 196 is greater than the diameter of the second diameter portion 198. In other embodiments, like the ones illustrated in FIGS. 9-14, the piston cavity 194B may have a substantially constant diameter. In certain embodiments, a portion of the first biasing member 74, including the second end thereof, may be disposed in the piston cavity 194, 194A. In other embodiments, the second end of the first biasing member 74 may contact the second end 192B of the base portion 188B. In this embodiment, the second end 192B of the base portion 188B is annular. Also, in this embodiment, the base portion 188B is annular and separated from the annular cap portion 190B by an annular groove 200. A sealing member 202 is disposed in the groove 200. In the embodiments illustrated in FIGS. 2-6 and 7-8, the groove 200 is formed in an outer surface of the base portion 188, 188A. The sealing member 202 provides a seal between the failsafe piston 186, 186A, 186B and the retaining member 100, 100A, 100B. In an embodiment, the sealing member 202 is an O-ring. However, in other embodiments (not depicted), the sealing member may be a U-cup seal, lip seal, O-ring seal, or backup ring seal.

In the embodiments illustrated in FIGS. 7-8, an opening 204 is provided in the cap portion 190A. In this embodiment, the opening 204 may be of a cylindrical shape. In another embodiment, like the one illustrated in FIG. 6, a protuberance 206 is attached to and extends away from the cap portion 190. In this embodiment, the protuberance 206 is hollow and has an opening provided at a first end 208 thereof. Preferably, in this embodiment, the protuberance 206 is of a hollow cylindrical shape. In other embodiments, the protuberance 206 may be of a different shape. The protuberance 206 is aligned with and extends through the end wall aperture 184. Under certain conditions, like those illustrated in FIG. 4, the first end 208 of the protuberance 206 is disposed in the first cavity 110.

In the embodiments illustrated in FIGS. 2-6, the protuberance 206 is aligned and engaged with a connecting shaft 210. In these embodiments, a first end portion 212 of the connecting shaft 210 is disposed in the opening in the first end 208 of the protuberance 206 to engage the failsafe piston 186 and the connecting shaft 210. In other embodiments, like the one illustrated in FIG. 8, the opening 204 in the cap portion 190A is aligned with the connecting shaft 210. In this embodiment, a first end portion 212 of the connecting shaft 210 is disposed in the opening 204 to enable engagement between the failsafe piston 186A and the connecting shaft. Although the connecting shaft 210 is engaged with the failsafe piston 186, 186A in the embodiments illustrated, the connecting shaft 210 and the failsafe piston 186, 186A may each move independently from each other in a −X direction under certain conditions. For the purposes of describing movement of certain portions of the valve assembly 20, 20A, 20B, in the −X direction may also be referred to herein as a direction away from the first perforation 102, 102B. Also, in the embodiments illustrated, the connecting shaft 210 and the failsafe piston 186, 186A may each move independently from each other in a +X direction under certain conditions. For the purposes of describing movement of certain portions of the valve assembly 20, 20A, 20B, in the +X direction may also be referred to herein as a direction toward the first perforation 102, 102B. The connecting shaft 210 is also aligned with the first perforation 102. In other embodiments, like those illustrated best in FIGS. 11-13, the connecting shaft 210B and the failsafe piston 186B are formed in a unitary manner. More particularly, the cap portion 190B and the connecting shaft 210B are formed in a unitary manner. In these embodiments, the connecting shaft 210B may be aligned with the piston cavity 194B. Also, in these embodiments, the connecting shaft 210B and the failsafe piston 186B do not move independently from each other.

The first end portion 212 is attached to a middle portion 214. In an embodiment, the middle portion 214 has an outer diameter which is greater than an outer diameter of the first end portion 212. In other embodiments, like the ones illustrated in FIGS. 11-13, the connecting shaft 210B is of a substantially constant diameter. In an embodiment, like the one illustrated in FIG. 6, when the tire pressure is being measured, increased or decreased, a first end 216 of the middle portion 156 abuts the end wall 176. Under these conditions, the first end portion 212 extends into the end wall aperture 184.

The middle portion 214 is of a generally cylindrical shape. At a rest state, like the ones illustrated in FIGS. 4 and 5, the middle portion 214 extends from an end of the first cavity 110 toward an opposite end of the first cavity 110. An annular upset 218 is provided at a second end of the middle portion 214 and adjacent a second end portion 220 of the connecting shaft 210. The second end of the middle portion 214 is attached to the second end portion 220 on an end thereof.

On an end, the connecting shaft 210, 210B is connected to the shuttle assembly 78, 78B. In the embodiments illustrated in FIGS. 2-6 and 7-8, the second end portion 220 is attached to the shuttle assembly 78. In an embodiment, the connecting shaft 210 and shuttle assembly 78 are attached to each other by disposing the second end portion 220 in the shuttle assembly 78. In this embodiment, the second end portion 220 may be attached to the shuttle assembly 78 via a threaded connection or using a similar method of attachment. In the embodiments illustrated in FIGS. 11-13, the end of the connecting shaft 210B is disposed in the shuttle assembly 78B. However, the connecting shaft 210B and the shuttle assembly 78B are connected so that the connecting shaft 210B and the failsafe piston 186B can move independently from the shuttle assembly 78B in a −X direction under certain conditions. Also, in these embodiments, the connecting shaft 210B and the failsafe piston 186B can move independently from the shuttle assembly 78B in a +X direction under certain conditions.

The shuttle assembly 78, 78B comprises a piston 222, 222B and a sealing member 224, 224B. In an embodiment, like the ones illustrated in FIGS. 2-8, the sealing member 224 is disposed in a groove 226 formed in an outer face of the piston 222. The groove 226 is of the dovetail variety. In this embodiment, the sealing member 224 is annular. Preferably, in this embodiment, the sealing member 224 is an O-ring. In other embodiments, like the ones illustrated in FIGS. 15-17, the sealing member 224B may be attached to the outer surface of the piston 222B. In these embodiments, the sealing member 224B may comprise a portion that is of a conical shape. Preferably, in these embodiments, the sealing member 224B comprises a frusto-conical shaped portion 228. It is preferred that in the embodiments described above, the sealing member 224, 224B is formed from a resilient material and is elastomeric.

The sealing member 224, 224B comprises a sealing surface 230, 230B. The sealing surface 230 is disposed adjacent the first perforation 102. In the embodiments illustrated in FIGS. 4 and 5, when the valve assembly 20 is in a rest state, the sealing member 224 is circumferentially disposed around the end 108 of the first perforation 102 and is in sealing contact with the inner surface 126 of the wall portion 94. In the embodiments illustrated in FIGS. 11 and 13, when the valve assembly 20B is in a rest state, the sealing member 224B may be disposed in the first perforation 102B and in sealing contact with the surface that defines the fourth portion 120 of the first perforation 102B. When the tire pressure is being measured, increased or decreased, as is illustrated in, for example, FIG. 6, a space 232 separates the sealing member 224 from the inner surface 126 of the wall portion 94.

The shuttle assembly 78, 78B is biased to an open position utilizing a second biasing member 76. In the open position, pressurized air can be transferred through the valve assembly 20, 20A, 20B so that the tire pressure can be measured, increased, or decreased. The bias applied to the shuttle assembly 78, 78B by the second biasing member 76 is applied to the piston 222, 222B in a direction away from the first perforation 102, 102B and toward the failsafe piston 186, 186A, 186B. Under certain conditions, the bias applied to the shuttle assembly 78, 78B by the second biasing member 76 urges the shuttle assembly 78, 78B towards the retaining member 100, 100B.

The shuttle assembly 78, 78B can also be in a closed position. The shuttle assembly 78, 78B is in a closed position when the valve assembly 20, 20A, 20B is in a rest state. In the closed position, pressurized air cannot be transferred through the valve assembly 20, 20A, 20B and the first perforation 102, 102B and the second perforation 132, 132B are not in fluid communication.

In an embodiment, like the one illustrated in FIG. 6, the piston 222 comprises a main portion 234 and a plurality of shuttle supports 236. In this embodiment, the piston 222 is unitarily formed by injection molding a thermoplastic, preferably polyoxymethylene, such as that sold by E.I. duPont de Nemours and Company under the trademark Delrin®. However, it should be appreciated that the piston 164 may be formed using other materials and processes. For example, the piston may be formed by machining a metal. It should also be appreciated that the piston may be formed by joining a plurality of components.

The main portion 234 is a cylindrical-shaped body. However, it should be appreciated that other shapes may be used. The main portion 234 comprises a side surface 238. A definition of the side surface may be defined by the process used to form the piston 222. The side surface 238 is shaped to increase a drag force applied to the shuttle assembly 78 by a fluid flowing adjacent thereto. The side surface 238 has a diameter smaller than the diameter of the first diameter portion 142 adjacent thereto. A space 240 between the side surface 238 and the outer wall portion 122, 122A forms a portion of a fluid passage 164 which exists when the valve assembly 20, 20A is in the open position.

The shuttle supports 236 are equally spaced apart and attached to the main portion 234. The shuttle supports 236 are shaped to increase a drag force to the shuttle assembly 78 by a fluid flowing adjacent thereto. Also, when the valve assembly 20, 20A is in the open position, each space 242 between successive shuttle supports 236 forms a portion of the fluid passage 164.

Figure 16:
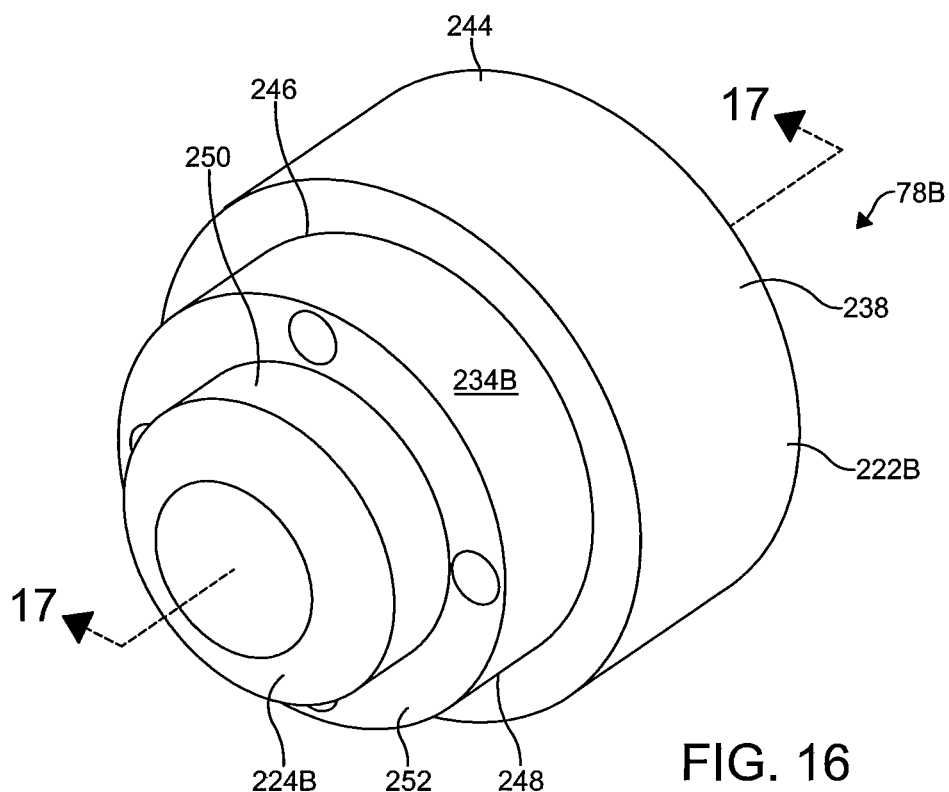
FIG. 16 depicts a perspective view of the shuttle assembly of FIG. 15.
Figure 17:
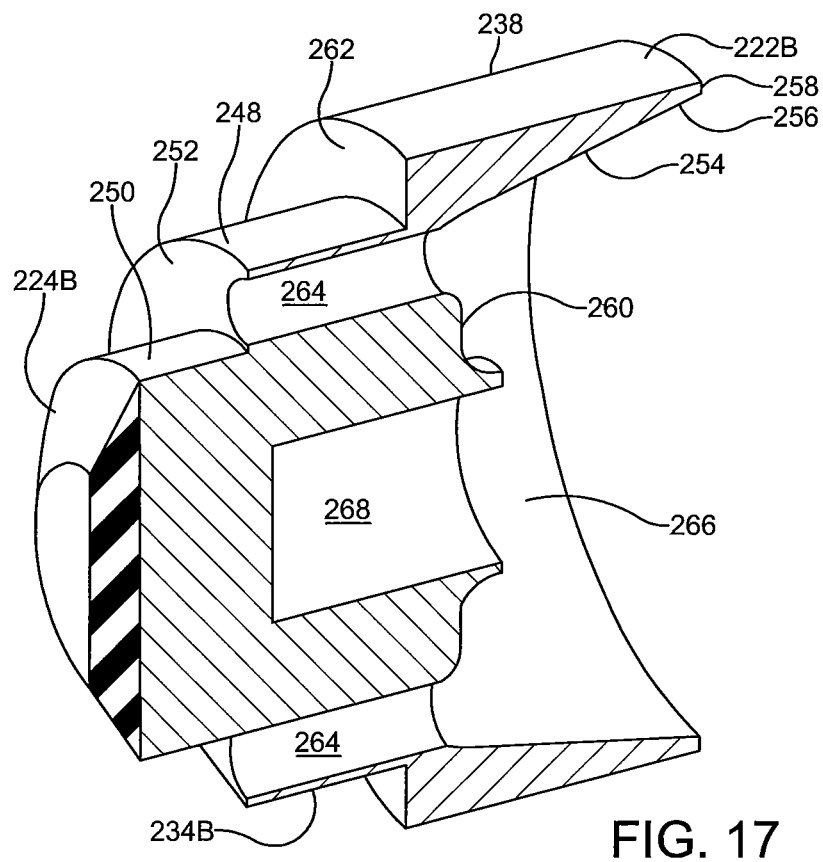
FIG. 17 depicts a sectional view of the shuttle assembly of FIG. 16.
Figure 18:
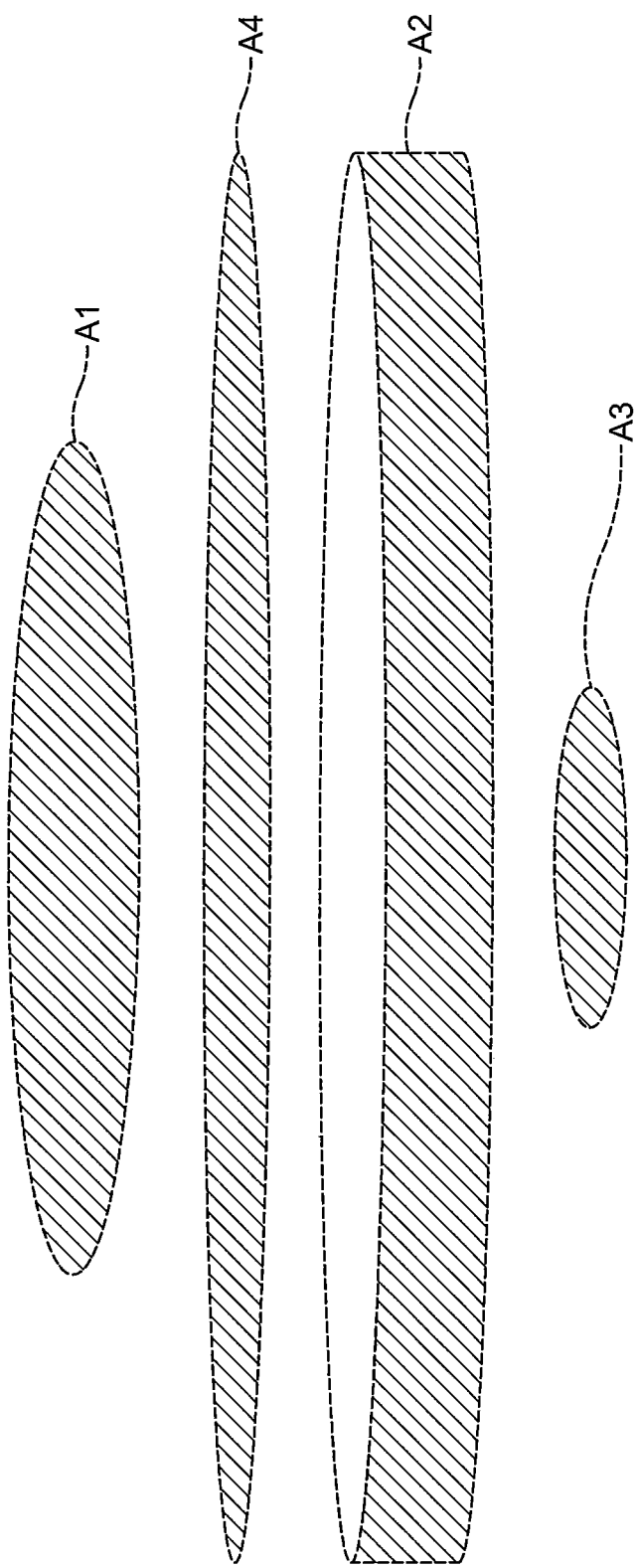
FIG. 18 depicts a perspective view of certain areas within the embodiments of the valve assembly.

In an embodiment, like the ones illustrated in FIGS. 16-17, the piston 222B comprises a main portion 234B. In this embodiment, the piston 222B may be unitarily formed by injection molding a thermoplastic or, for example, by machining a metal. It should also be appreciated that in these embodiments the piston may be formed by joining a plurality of components.

In the embodiments illustrated in FIGS. 16-17, the main portion 234B comprises two or more generally cylindrical-shaped portions 244, 246. However, it should be appreciated that other shaped portions may be used to form the main portion. In an embodiment, the main portion 234B comprises a first side surface 178 that has a diameter that is greater than a diameter of a second side surface 248. The second side surface 248 has a diameter that is greater than a diameter of another side surface 250, which connects the sealing member 224B with a second end surface 252. The side surfaces 238, 248, 250 are provided in a parallel relationship with each other. As illustrated best in FIG. 17, the main portion 234B also comprises an inner surface 254. A first portion 256 of the inner surface 254 gradually increases in thickness from an end 258 of the shuttle assembly 78B toward a second portion 260 of the inner surface 254.

On an end, the second side surface 248 is attached to a first end surface 262. On an opposite end, the second side surface 248 is attached to the second end surface 252. The end surfaces 252, 262 are provided in a parallel relationship with each other. A plurality of openings 264 are provided in the second end surface 252. The openings 264 form a portion of the fluid passage 164B which exists when the valve assembly 20B is in the measurement state, inflate state, or deflate state, which is illustrated in FIG. 12. As illustrated best in FIG. 17, the openings 264 extend from the second end surface 252 into a first piston cavity 266 defined by the inner surface 254 of the main portion 234B. The inner surface 254 also defines a second piston cavity 268. The second piston cavity 268 receives an end portion 270 of the connecting shaft 210B. The connecting shaft 210B extends through the first piston cavity 266 and into the second piston cavity 268 where the end 272 of the connecting shaft 210B abuts an inner surface end surface 274 when the valve assembly 20B is in the rest state illustrated in FIG. 13. In the rest state illustrated in FIG. 11, a space 276 separates the end 272 of the connecting shaft 210B and the inner surface end surface 274.

The first piston cavity 266 forms a portion of the fluid passage 164B when the valve assembly 20B is in the measurement state, inflate state, or deflate state illustrated in FIG. 12. On an end, the first piston cavity 266 is in fluid communication with the openings 264 in the second end surface 252. On an opposite end, the first piston cavity 266 is in fluid communication with the spaces 162 provided between the legs 152 of the retaining member 100B.

In an embodiment, the second biasing member 76 is a compression spring. Preferably, in this embodiment, the second biasing member 76 is a coil spring. The second biasing member 76 may be formed from a spring steel. However, it should be appreciated that the second biasing member 76 may be of another kind, type, make and/or formed from another material.

As illustrated in FIGS. 4-6, 7, and 11-13, the second biasing member 76 is disposed in the first cavity 110, 110B adjacent the first perforation 102, 102B. The second biasing member 76 is pretensioned. The second biasing member 76 contacts the shuttle assembly 78 and applies a force thereto. The force applied to the shuttle assembly 78, 78B by the second biasing member 76 is in a direction away from the first perforation 102, 102B. To open the valve assembly 20, 20A, 20B, the second biasing member 76 urges the shuttle assembly 78, 78B towards the retaining member 100, 100B. In the embodiments illustrated in FIGS. 2-6 and 7-8, the second biasing member 76 applies the force to the shuttle assembly 78 via contact with the plurality of shuttle supports 236. In these embodiments, a first member end of the second biasing member 76 may abut each of the shuttle supports 236 and a second member end abuts the wall portion 94. In the embodiments illustrated in FIGS. 11-13, the second biasing member 76 applies the force to the shuttle assembly 78B via contact with the first end surface 262 thereof.

As mentioned above, the valve assembly 20, 20A, 20B may be in the closed position or the open position. In the open position, the fluid passage 164, 164B is provided through the valve assembly 20, 20A, 20B. In an embodiment, the fluid passage 164 comprises the first perforation 102, second perforation 132, space 232 between the sealing member 224 and the wall portion 94, space 240 between the shuttle assembly 78 and the outer wall portion 122, and one or more of the spaces 242 between the shuttle supports 236. In another embodiment, like the one illustrated in FIG. 12, the fluid passage 164B comprises the first perforation 102B, second perforation 132B, the first cavity 110B, the first piston cavity 266, the openings 264 in the second end surface 252, and the spaces 162 provided between the legs 152 of the retaining member 100B.

When a pressure differential between the pressure within the fluid control circuit 56 and the tire pressure is above an opening threshold, the valve assembly 20, 20A, 20B is in or placed in the open position. Referring now to FIGS. 4, 5, 12, 13, and 18, a relationship between an area A4 (hereinafter referred to as the fourth area) of the shuttle assembly 78, 78B when the valve assembly 20, 20A, 20B is in the closed position, the spring rate of the second biasing member 76, and the pressure differential between the pressure within the fluid control circuit 56 and the tire pressure determines the opening threshold and facilitates placing the valve assembly 20, 20A, 20B in the open position. Preferably, the opening threshold is about 5 psi or more. More preferably, the opening threshold is about 5 to about 8 psi. The valve assembly 20, 20A, 20B may be configured to have a specific opening threshold. In the open position, which is shown in FIGS. 6, 7, and 12, the sealing member 224, 224B does not contact the wall portion 94, 94B, allowing a flow of the pressurized air from the second perforation 132, 132B to the first perforation 102, 102B through the fluid passage 164, 164B or allowing a flow of the pressurized fluid from the first perforation 102, 102B to the second perforation 132, 132B through the fluid passage 164, 164B.

When a pressure differential between the tire pressure and the pressure within the fluid control circuit 56 is above a closing threshold, the valve assembly 20, 20A, 20B is in or placed in the closed position. Preferably, the closing threshold is about 5 to about 8 psi. The valve assembly 20, 20A, 20B may be configured to be at a specific closing threshold. In the closed position, the sealing member 224, 224B sealingly contacts with the wall portion 94, 94B, preventing a flow of the pressurized air from the first perforation 102, 102B to the second perforation 132, 132B or vice versa. The valve assembly 20, 20A, 20B remains in the closed position until the tire pressure management system 24 determines that the tire pressure needs to be adjusted.

Also, with reference to FIGS. 6, 7, 12 and 18, a relationship between an area A1 (hereinafter referred to as the first area) of the first perforation 102, 102B, an area A2 (hereinafter referred to as the second area) between the shuttle assembly 78, 78B and the wall portion 94, 94B when the valve assembly 20, 20A, 20B is in the open position which corresponds to an area of a side of a right cylinder and an area A3 (hereinafter referred to as the third area) of the second perforation 132, 132B determines the closing threshold and facilitates placing the valve assembly 20, 20A, 20B in the closed position. In the embodiments illustrated in FIGS. 9-13, the third area A3 is located in the tire stem 82. The first area A1 must be greater than the second area A2, and the third area A3 must be greater than the second area A2 to obtain the closing threshold that is desirable for use with the tire pressure management system 24. It should be appreciated that the areas A1, A2, A3, A4 could be of other sizes, proportions, and in different locations in order to provide alternative opening thresholds, closing thresholds, pressure targets and valve functions.

However, under certain conditions such as, for example, low tire pressure conditions, obtaining the pressure differential needed between the tire pressure and the pressure within the fluid control circuit 56 to place the valve assembly 20, 20A, 20B in the closed position is not achievable. If the valve assembly 20, 20A, 20B cannot be placed in the closed position, the tire pressure could decrease to 0 psi or the tire may fail. Also, if the tire pressure is decreased to 0 psi, then the tire may undesirably decouple from the wheel rim.

Advantageously, under low tire pressure conditions like those described above, the valve assembly 20, 20A, 20B described herein can be placed into the closed position preventing the tire pressure from decreasing to 0 psi. Also, if the tire pressure is 0 psi, having the valve assembly 20, 20A, 20B in the closed position allows the tire pressure to be increased and, should it be lost, enables the tire bead to be re-established on the wheel rim. The valve assembly 20, 20A, 20B can be placed into the closed position under low tire pressure conditions because, under these conditions, the bias applied by the first biasing member 74 to the failsafe piston 186, 186A, 186B is greater than the bias applied to the failsafe piston 186, 186A, 186B by the tire pressure. Since the bias applied by the first biasing member 74 to the failsafe piston 186, 186A, 186B is greater than the bias applied to the failsafe piston 186, 186A, 186B by the tire pressure, the failsafe piston 186, 186A, 186B is urged toward the first cavity 110, 110B and the shuttle assembly 78, 78B in a +X direction. When the failsafe piston 186 is urged toward the first cavity 110 by the first biasing member 74 in the embodiments shown in FIGS. 2-6, the first end 208 of the protuberance 206 is urged through the end wall aperture 184 and extends into the first cavity 110 as is shown in FIG. 4.

Movement of the failsafe piston 186, 186A, 186B in the +X direction under low tire pressure conditions applies a force to the connecting shaft 210, 210B in the +X direction. The force applied to the connecting shaft 210, 210B in the +X direction maintains the position of the connecting shaft 210, 210B which prevents the shuttle assembly 78, 78B from moving in the −X direction and opening the valve assembly 20, 20A, 20B. Under these conditions, the sealing member 224, 224B sealingly contacts with the wall portion 94 or the surface that defines the fourth portion 120 of the first perforation 102B, which maintains the valve assembly 20, 20A, 20B in the closed position, which is shown in FIGS. 4 and 13. The failsafe piston 186, 186A, 186B remains in this position until the tire pressure is increased to a predetermined value to move the failsafe piston 186, 186A, 186B in the −X direction. When the tire pressure is increased to a predetermined value such that the bias applied by the tire pressure via the second perforation 132, 132B to the failsafe piston 186, 186A, 186B is greater than the bias applied to the failsafe piston 186, 186A, 186B by the first biasing member 74, the failsafe piston 186, 186A, 186B moves in the −X direction. In certain embodiments, the failsafe piston 186 moves in the −X direction until the second end 192, 192A of the piston 186, 186A abuts the second portion 88 or the retaining member 100A. In other embodiments, like the ones illustrated in FIGS. 11 and 13, the failsafe piston 186B moves in the −X direction until the space 276 separates the end 272 of the connecting shaft 210B and the inner surface end surface 274 of the shuttle assembly 78B.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A valve assembly for a tire pressure management system, comprising:
   a housing having a first perforation and a second perforation, the first perforation selectively in fluid communication with the second perforation;
   a shuttle assembly provided in the housing;
   a failsafe piston connected to the shuttle assembly;
   a first biasing member applying a bias to the failsafe piston; and
   a second biasing member applying a bias to the shuttle assembly;
   wherein, when a pressure differential between a pressure in the second perforation and a pressure in the first perforation is at or below a predetermined value, the bias applied by the first biasing member urges the failsafe piston toward the shuttle assembly to prevent fluid communication between the first perforation and the second perforation; and
   wherein a pressure in the second perforation is at or above a predetermined value, the failsafe piston moves in a direction away from the first perforation.

2. The valve assembly of claim 1, wherein the second biasing member is in contact with the shuttle assembly and the failsafe piston is connected to the shuttle assembly via a shaft.

3. The valve assembly of claim 1, wherein the second biasing member is provided in the housing adjacent the first perforation and the bias applied to the shuttle assembly by the second biasing member is in a direction away from the first perforation.

4. The valve assembly of claim 1, further comprising a sealing member disposed in an annular groove formed in the failsafe piston.

5. The valve assembly of claim 1, further comprising a first cavity in fluid communication with a second cavity, wherein the failsafe piston is moveable within the second cavity.

6. The valve assembly of claim 1, wherein the failsafe piston is connected to the shuttle assembly in such a manner that the failsafe piston is capable of movement which is independent from movement of the shuttle assembly.

7. The valve assembly of claim 1, wherein the bias applied to the failsafe piston by the first biasing member is in a direction toward the first perforation.

8. The valve assembly of claim 1, wherein the shuttle assembly comprises a piston and a sealing member.

9. The valve assembly of claim 1, further comprising a retaining member which houses the first biasing member, wherein the retaining member comprises a depressor member which extends into the second perforation.

10. The valve assembly of claim 2, wherein an end of the shaft is disposed in the shuttle assembly.

11. The valve assembly of claim 2, wherein the failsafe piston and the shaft are formed in a unitary manner.

12. The valve assembly of claim 4, further comprising a retaining member, wherein failsafe piston is at least partially disposed within the retaining member and the sealing member provides a seal between the failsafe piston and the retaining member.

13. The valve assembly of claim 7, wherein the bias applied to the failsafe piston by the first biasing member is in a direction toward the shuttle assembly and the bias applied to the shuttle assembly by the second biasing member is in a direction toward the failsafe piston.

14. The valve assembly of claim 8, wherein the sealing member is formed from an elastomeric material and is attached to an outer surface of the piston or is disposed in a groove formed in the outer surface of the piston.

15. The valve assembly of claim 10, wherein a space separates the end of the shaft from an inner end surface of the shuttle assembly.

16. The valve assembly of claim 14, wherein, when the valve assembly is in a rest state, the sealing member is circumferentially disposed around an end of the first perforation or is disposed in the first perforation.

17. The valve assembly of claim 16, wherein the sealing member is disposed in the first perforation and is in sealing contact with a surface that defines a portion of the first perforation.

18. A valve assembly for a tire pressure management system, comprising:
  a housing having a first perforation and a second perforation, the first perforation selectively in fluid communication with the second perforation;
  a shuttle assembly provided in the housing;
  a failsafe piston connected to the shuttle assembly via a shaft;
  a first biasing member applying a bias to the failsafe piston; and
  a second biasing member applying a bias to the shuttle assembly in a direction away from the first perforation;
  wherein, when a pressure differential between a pressure in the second perforation and a pressure in the first perforation is at or below a predetermined value, the bias applied by the first biasing member urges the failsafe piston toward the shuttle assembly to prevent fluid communication between the first perforation and the second perforation; and
  wherein a pressure in the second perforation is at or above a predetermined value, the failsafe piston moves in a direction away from the first perforation.

19. The valve assembly of claim 18, wherein the bias applied to the failsafe piston by the first biasing member is in a direction toward the first perforation and the failsafe piston is at least partially disposed within a retaining member, the retaining member houses the first biasing member and comprises a depressor member which extends into the second perforation.

* * * * *